June 18, 1946.   G. L. DAVIES   2,402,378
RADIO BEACON SYSTEM
Filed Jan. 27, 1942

Inventor
Gomer L. Davies
By /s/ Samuel Scrivener Jr.
Attorney

Patented June 18, 1946

2,402,378

UNITED STATES PATENT OFFICE 2,402,378

RADIO BEACON SYSTEM

Gomer L. Davies, Woodside, Md., assignor to Washington Institute of Technology, Inc., Washington, D. C.

Application January 27, 1942, Serial No. 428,432

7 Claims. (Cl. 250—11)

This invention relates, generally, to radio beacon systems and, more particularly, to beacon systems which are particularly useful in determining location with respect to a source of radiations and thereafter guiding the aircraft during landing.

It is the principal object of the invention to provide a beacon system in which two directional fields or groups of directional fields are radiated, one of which fields or groups of fields is particularly useful for guidance along a predetermined course, while the other is particularly intended to provide information to the pilot of his azimuthal position with respect to the source of radiations. In a preferred embodiment of the invention the fields or groups of fields are differentiated by the different characteristic frequencies of the energy establishing them.

It is another object of the invention to provide a radio guidance and orientation system in which two groups of directional fields of different frequencies are radiated and received, the means for receiving one of the groups of fields, which is adapted for guidance of a landing aircraft along a predetermined course, being operable to control the sensitivity of the receiving means to the other group of fields, which is adapted for azimuthal orientation of the aircraft, whereby the receiving means will be operable to provide azimuthal orientation so long as necessary and, when the aircraft is in position to descend along the beacon course, will be operable to produce an indication of deviation therefrom without interference from the other fields.

It is a further object of the invention to eliminate course bending and multiple course effects in radio beacon and landing systems by providing a directional field or fields producing an indication of azimuthal location with respect to the source of radiations and a second pair of overlapping, elongated, narrow fields which are concentrated within a narrow zone to reduce interference effects, and which provide localizer or landing course indications.

Other objects and features of novelty will be made apparent from the following description and the annexed drawing, it being understood that such description and drawing are only illustrative of the invention which is not limited thereby or otherwise than by the appended claims.

Figure 1:
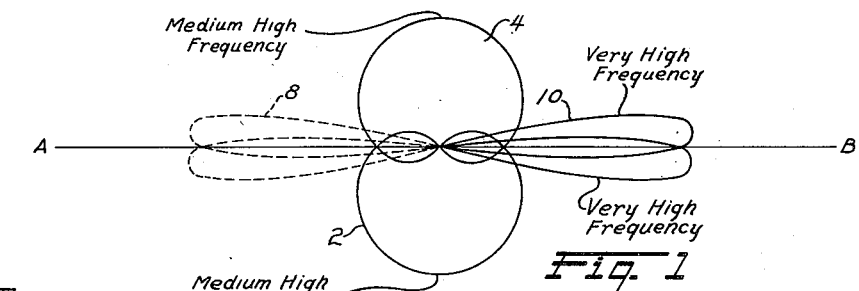
Figure 2:
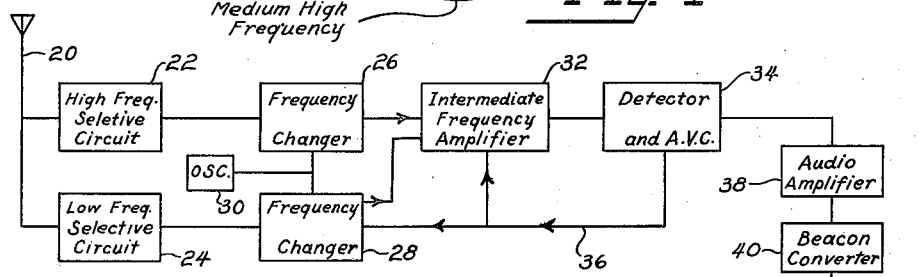
Figure 3:
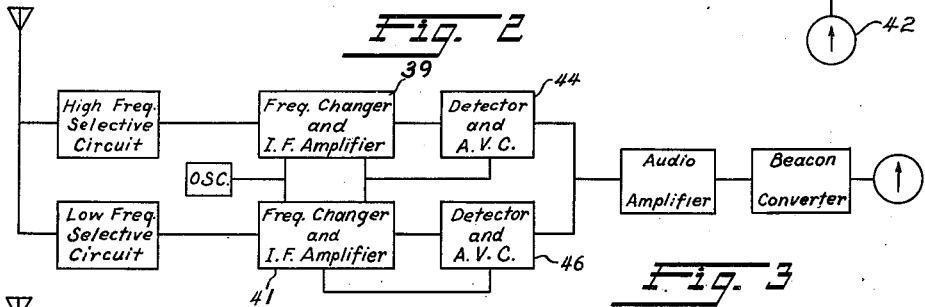
Figure 4:
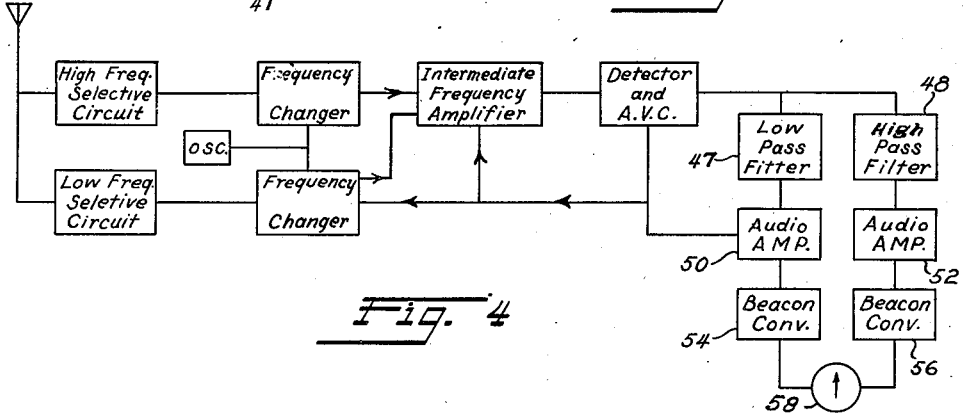

Referring to the drawing, in which the same reference numerals and letters refer to corresponding elements, Fig. 1 is a diagrammatic showing of radiated fields in accordance with the invention, and Figs. 2, 3 and 4 are schematic diagrams of receiving systems in accordance with the invention.

This invention is particularly intended to provide radio transmitting and receiving means for determining the location of an aircraft in azimuth about the source of radiations, and other radio transmitting and receiving means for guiding the aircraft longitudinally along a runway or other predetermined path. The means for providing an indication of azimuthal location comprises transmitting means on the ground and receiving means in the aircraft, the transmitting means preferably comprising means for radiating a directional field or overlapping directional fields throughout 360° about the source of radiations. In a preferred embodiment of the invention, which is shown diagrammatically in Fig. 1, such means may radiate two oppositely-directed, differently modulated, cardioid-shaped fields 2, 4 which overlap along any desirable and suitable course and which are preferably radiated at a low ultrahigh frequency, for example 110 megacycles. It is preferred that such field or fields be radiated in all azimuthal directions about the source, in order that 360° orientation may be secured by the landing aircraft. Other types of directional fields, such as figure-of-eight fields, may be radiated in place of the cardioid fields, the only requirement being that a signal be available throughout 360° about the source. Any desired or suitable means may be employed to radiate the fields.

The means for providing guidance along the landing course comprises preferably a beacon of the equi-signal, aural or visual type, which may be established in a known manner by narrow overlapping fields 8, 10 which are so radiated as to be elongated in the direction of the course A—B. These fields are radiated at a frequency different from that of fields 2, 4 and, preferably, at a very high frequency. The preferred form and relation of the azimuth-indicating fields 2, 4 and of the beacon fields 8, 10 is shown in Fig. 1. The narrow, elongated shape of these fields reduces possible interference effects, this being of particular importance at high frequencies. If desired, the beacon fields 8, 10 may be of figure-of-eight shape, in which case the narrow, elongated lobes will overlap in directions separated 180° to provide a beacon course extending in each direction from the source of radiations. The additional lobes to provide the figure-of-eight field are shown in dotted lines in Fig. 1.

Means are provided by the invention for receiving the described radiated fields on an aircraft, and for causing reception of one of the fields, such as the beacon fields, to reduce the sensitivity of the receiving means to the other fields, whereby the receiving means will not respond to the azimuth-indicating field or fields when the aircraft is landing on the beacon. A preferred arrangement of such receiving means is illustrated in Fig. 2 and comprises a non-directional antenna 20 supplying energy to a high frequency selective circuit 22 which is tuned to the frequency of beacon fields 8, 10 and a low frequency selective circuit 24 which is tuned to the frequency of azimuth-indicating fields 2, 4. The outputs of selective circuits 22, 24 are supplied to frequency changers 26, 28, respectively, which are operated by an oscillator 30. The intermediate frequencies so produced are amplified at 32 and supplied to a detector and automatic volume control means 34 which is connected, as at 36, to reduce the sensitivity of the receiving means to the frequency of the azimuth-indicating fields 2, 4 when the radio frequencies of the fields 8, 10 are received. The detected and controlled signal, whether high or low frequency, is supplied to an audio amplifier 38 and from thence to a beacon converter 40 which supplies the modulation frequencies or signals of the fields 2 and 4, or 8 and 10, to a suitable course-indicating device 42 in order to produce an indication of azimuthal location with respect to the source of fields 2, 4 when those fields are being received, or of adherence to or deviation from the beacon or landing course defined by fields 8, 10 when those fields are received. In either case, the indication is produced in the manner known in the equi-signal beacon art.

In the operation and use of the described transmitting and receiving systems, the azimuth-indicating fields 2, 4 will be received on an aircraft approaching the landing area on or near which the source of such fields is located, regardless of the location of the aircraft in azimuth about the source. These fields will cause the indicator 42 to produce an indication, in a known manner, which will be different in each azimuthal direction about the source of radiations of field 2, 4 and will therefore denote the azimuthal location of the aircraft with respect to the source. This less precise indication may be utilized by the pilot to direct the aircraft to a point within the effective range of the beacon fields 8, 10. When these fields are received the automatic volume control will be operated by signals due to fields 8, 10 to reduce the sensitivity of the receiving means to the frequency of the azimuth-indicating fields 2, 4, whereby the indicator 28 is actuated solely in response to the beacon fields. The aircraft may accordingly be navigated within these fields to a landing along the beacon course A, B.

Automatic volume control voltage is applied to the intermediate frequency amplifier 32 and to the frequency changer 28, but not to frequency changer 26. When the low frequency transmitter signal predominates over the high frequency signal the action of the automatic volume control will be such as to maintain constant detector output from the low frequency signal, but the gain of the intermediate amplifier will be held down sufficiently by the signal so that the high frequency signal will not be received. Along the course indicated in Fig. 1 by the line A—B, the high frequency signal will be very much stronger than the low frequency signal, and as a result a high automatic volume control voltage will be developed by the signal. The action of this voltage on the intermediate frequency amplifier will be such as to maintain a constant detector output from the high frequency signal while the same high automatic volume control voltage applied to the frequency changer 28 will reduce further the sensitivity of the receiver for the low frequency signal and hence prevent response to it.

In the small regions in which the two signals have comparable intensities, both will undoubtedly be received but in these regions both signals will produce the same indication on the instrument and hence no ambiguity will result.

If desired, the intermediate frequency signal produced by reception of beacon fields 8, 10 may be utilized to reduce the sensitivity of the receiving means to the radio frequency of the azimuth-indicating fields 8, 10. A system for effecting this is disclosed in Fig. 3, in which, it will be seen, the intermediate frequencies produced and amplified at 39 and 41 from the high and low frequencies of the two fields 2, 4 and 8, 10, are separately supplied to two detector and automatic volume control stages 44 and 46, respectively. The automatic-volume control 46 for signals due to the fields 2, 4 is connected to control only the low frequency amplifier whereas the automatic volume control 44 for signals due to fields 8, 10 is operable to control both the high and low frequency amplifiers. In this manner, reception of fields 8, 10 causes the production of an intermediate frequency signal due thereto which operates the associated volume control 44 to reduce the sensitivity of the receiving means to the radio frequency of the azimuth-indicating fields 2, 4.

If desired, the control may be exercised in the audio frequency stages and a system which is so operable is disclosed in Fig. 4. This circuit may, as shown, be identical with that of Fig. 2 through the detector stage but, whereas in the system of Fig. 2 the automatic volume control operated on the low radio frequency circuits at the intermediate frequency stage, in this circuit such control is imposed also at the audio amplifier 50. Thus, the detected signals are supplied to low and high pass filters 47, 48 which, respectively, supply the audio amplifiers 50, 52, the outputs of which are connected to the beacon converters 54, 56, the indicator 58 being provided in the known manner.

It will be apparent to those skilled in the art that various modifications, improvements and further embodiments of the disclosed invention may be made. Thus, fields of different shapes than those disclosed may be radiated, or a different type of range beacon utilized, and other receiving means and systems than those disclosed may be employed without departing in any way from the spirit or scope of the invention, for the limits of which reference must be had to the appended claims.

I claim:

1. A radio guidance system comprising means for radiating at least one directional field at a first frequency, means for radiating at a different frequency and from approximately the same location directional fields which overlap to define an equi-signal beacon course, means for receiving said fields and producing from energy received from the first-named directional field an indication of azimuthal location with respect to the source of radiations and for producing from energy received from the overlapping fields an indication of location with respect to the beacon course, and means responsive to energy received from the overlapping fields for reducing the sensitivity of the receiving means to the first-named field.

2. A radio guidance system according to claim 1, in which the last-named means comprise an automatic volume control operated by energy received from the overlapping fields.

3. A radio guidance system according to claim 1, in which the last-named means operate on the radio frequency stages of the receiving means.

4. A radio guidance system according to claim 1, in which the last-named means operate on the audio frequency stages of the receiving means.

5. A radio guidance system comprising means for radiating at least one directional field at a known frequency, means for radiating at a different frequency and from approximately the same location directional fields which overlap to define an equi-signal beacon course, means for receiving said fields and producing from energy received from the first-named directional field an indication of azimuthal location with respect to the source of radiations and for producing from energy received from the overlapping fields an indication of location with respect to the beacon course, and means responsive to increases in the energy received from the overlapping fields for reducing the sensitivity of the receiving means to the frequency of the first-named field.

6. A radio guidance system for aircraft comprising means for radiating two cardioid-shaped, oppositely-directed fields and two figure-of-eight shaped fields which overlap to define an equi-signal course and which are elongated in the direction of the beacon course and which are radiated at a frequency different from that of the cardioid-shaped fields, means on the aircraft for receiving said fields and separating the received energy due to the cardioid-shaped fields from that due to the figure-of-eight shaped fields, means for producing from received energy due to the cardioid-shaped fields an indication of the azimuthal location of the aircraft with respect to the source of radiations, means for producing from received energy due to the figure-of-eight shaped fields an indication of the location of the aircraft with respect to the equi-signal course, and means responsive to received energy due to the figure-of-eight fields for reducing the sensitivity of the receiving means to energy of the frequency of the cardioid-shaped fields.

7. A radio guidance system comprising means for radiating two differently characterized fields in overlapping relation which are substantially confined to a narrow angular zone, means for radiating two additionally differently-characterized overlapping fields extending over an angular zone embracing and extending outside of the limited angular zone of the first two fields, means for receiving said fields and for producing indications of the location of the receiving means with respect to the overlapping areas of the two pairs of fields, and means operable by received energy due to the first overlapping fields to reduce the sensitivity of the receiving means to the second-named fields.

GOMER L. DAVIES.